(12) United States Patent
Amaya et al.

(10) Patent No.: US 9,840,033 B2
(45) Date of Patent: Dec. 12, 2017

(54) MOLD FOR RESIN INJECTION MOLDING

(71) Applicant: Matsuura Machinery Corporation, Fukui, Fukui (JP)

(72) Inventors: Kouichi Amaya, Fukui (JP); Yukinori Urushizaki, Fukui (JP); Ryuzo Tanaka, Fukui (JP)

(73) Assignee: Matsuura Machinery Corporation, Fukui, Fukui (JP)

(*) Notice: Subject to any disclaimer, the term of this patent is extended or adjusted under 35 U.S.C. 154(b) by 107 days.

(21) Appl. No.: 14/811,047

(22) Filed: Jul. 28, 2015

(65) Prior Publication Data

US 2016/0297128 A1 Oct. 13, 2016

(30) Foreign Application Priority Data

Apr. 10, 2015 (JP) ................. 2015-081079

(51) Int. Cl.
| | |
|---|---|
| B29C 45/17 | (2006.01) |
| B29C 45/73 | (2006.01) |
| B29C 33/38 | (2006.01) |
| B22F 3/105 | (2006.01) |
| B29L 31/00 | (2006.01) |
| B22F 5/00 | (2006.01) |
| B29C 45/72 | (2006.01) |

(52) U.S. Cl.
CPC ...... B29C 45/1703 (2013.01); B29C 33/3814 (2013.01); B29C 45/73 (2013.01); B22F 3/1055 (2013.01); B22F 5/007 (2013.01); B29C 45/7207 (2013.01); B29C 45/7312 (2013.01); B29L 2031/757 (2013.01); Y02P 10/292 (2015.11); Y02P 10/295 (2015.11)

(58) Field of Classification Search
CPC ........................ B29C 45/345; B29C 33/10
See application file for complete search history.

(56) References Cited

U.S. PATENT DOCUMENTS

| | | | | |
|---|---|---|---|---|
| 4,165,062 A | * | 8/1979 | Mitchell | B29C 45/345 249/141 |
| 4,422,840 A | * | 12/1983 | Posch | B22D 17/14 425/472 |
| 2011/0045120 A1 | * | 2/2011 | Higashi | B22F 5/007 425/552 |
| 2013/0069282 A1 | * | 3/2013 | Abe | B29C 67/0077 264/328.1 |

FOREIGN PATENT DOCUMENTS

| | | |
|---|---|---|
| JP | 8-300363 A | 11/1996 |
| JP | 2007-160580 A | 6/2007 |
| JP | 2010-65259 A | 3/2010 |
| JP | 5575374 B2 | 7/2014 |

* cited by examiner

*Primary Examiner* — Ryan Ochylski
(74) *Attorney, Agent, or Firm* — Richard M. Goldberg

(57) ABSTRACT

A mold for resin injection molding 1 having a shaping region formed by a low-density shaped portion 22 and a high-density shaped portion 21 in which each ventilation channel 32 for gas existing between an external region and a molding portion region forms a hollow state surrounded by a peripheral wall having any one or both of the high-density shaped portion 21 and the low-density shaped portion 22, and the secondary vent 33 connecting communicatively with a region molding portion is formed only by a low-density shaped portion 22 with thickness thinner than that of the shaping region.

10 Claims, 3 Drawing Sheets

[Fig.1]
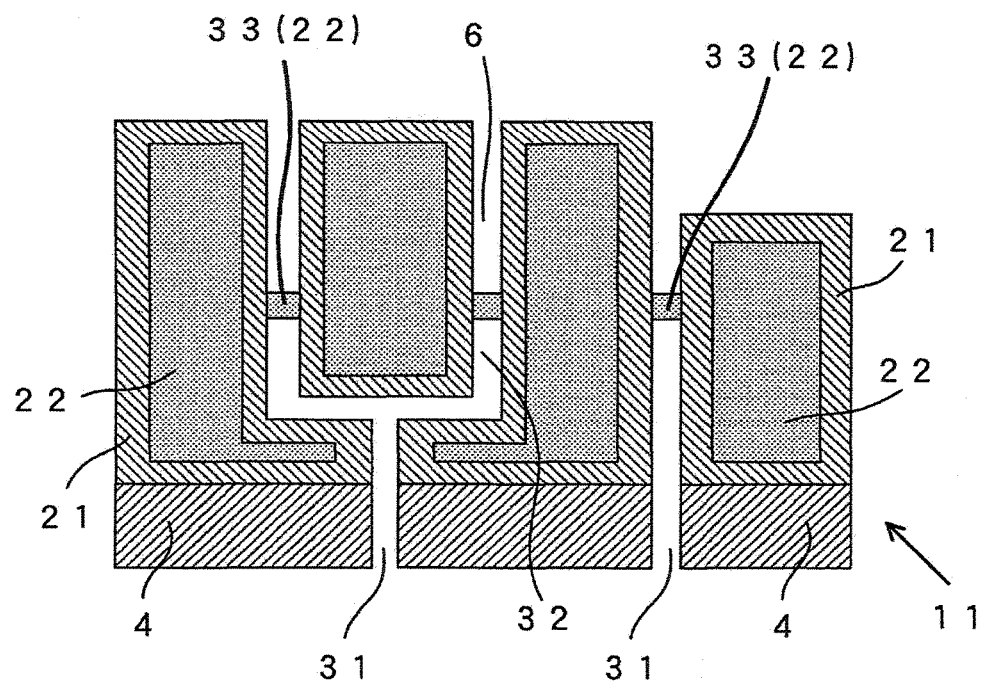
[Fig.2]
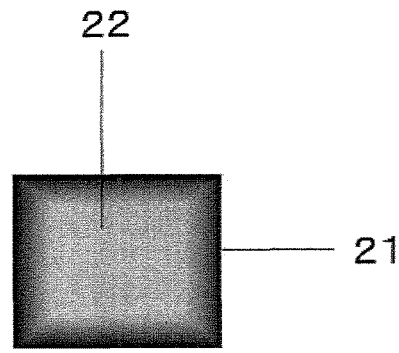

[Fig.3]
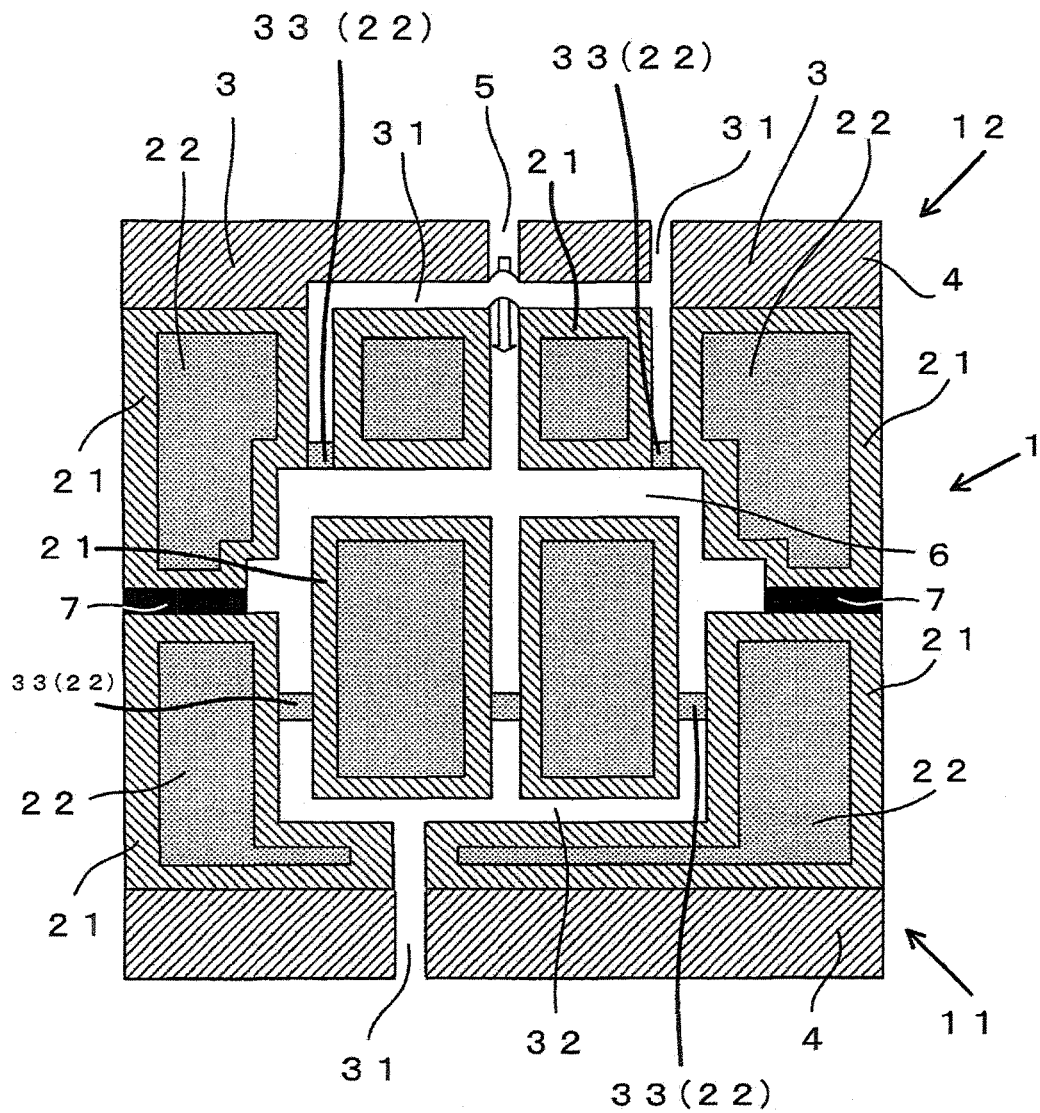

[Fig.4]
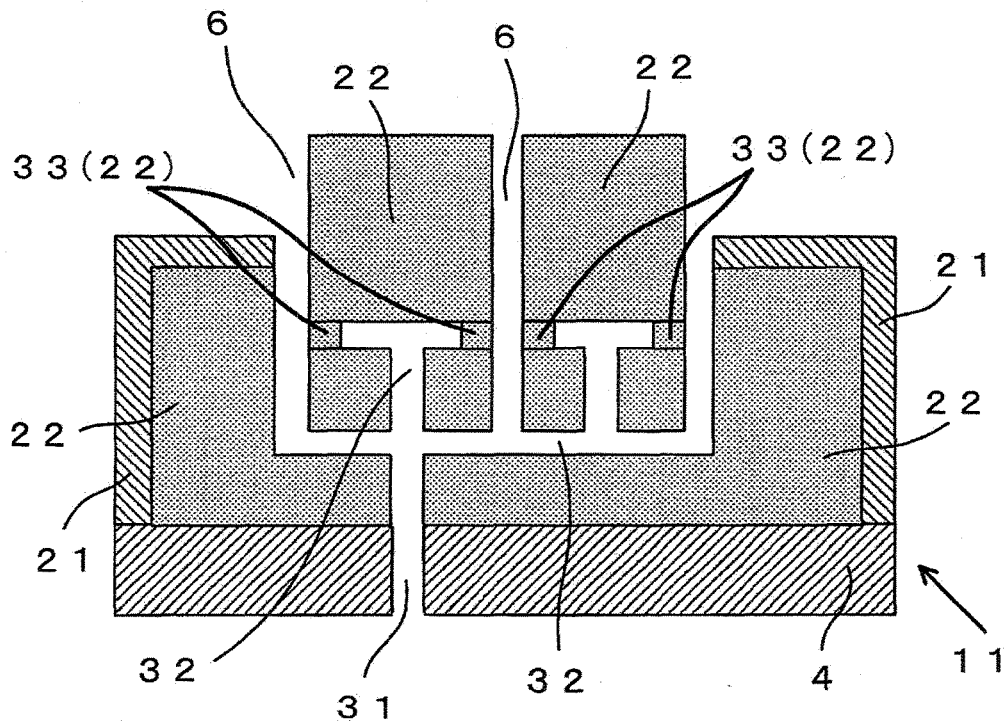
[Fig.5]
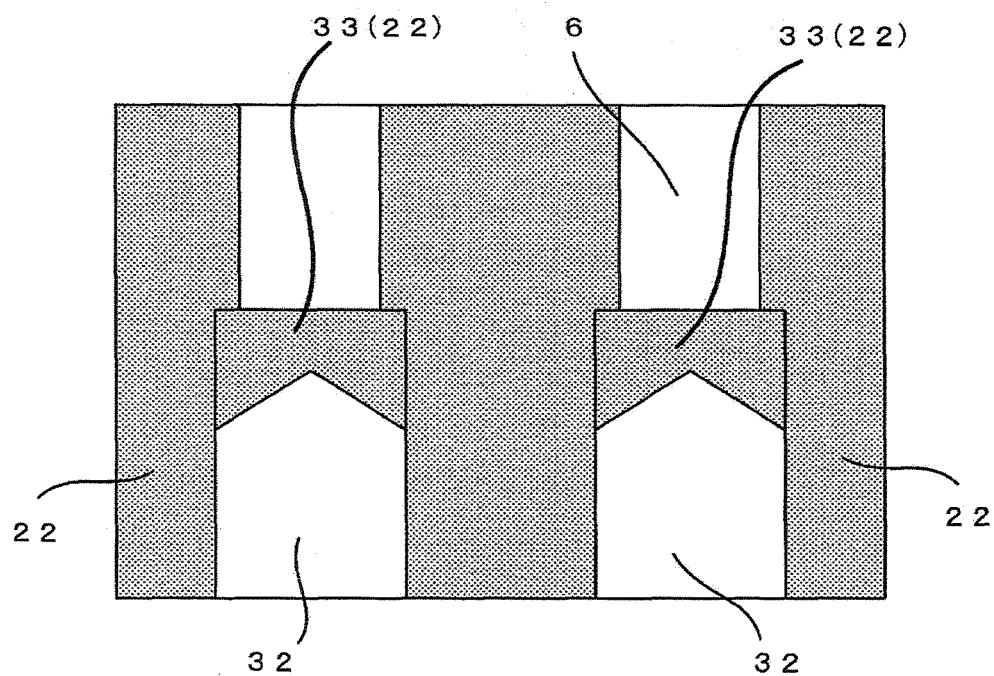

MOLD FOR RESIN INJECTION MOLDING

TECHNICAL FIELD

The present invention relates to a mold for resin injection molding to be manufactured by three-dimensional laser sintering.

BACKGROUND OF THE INVENTION

Background Art

In the above-described molds for resin injection molding, a constitution having a shaping region divided by a low-density shaped portion having a sintered density that allows a gas blown or sucked by the above-described three-dimensional laser sintering to pass therethrough and a high-density shaped portion having a sintered density that does not allow the gas to pass therethrough has recently been adopted.

In the case of such a divisional constitution, as described in Patent Document 1, a gas venting function via the low-density shaped portion can be fulfilled during resin injection molding.

However, in Patent Document 1, it has not been particularly studied how to effectively achieve heating and cooling by a blown or sucked gas with efficiency during resin injection molding and to cause gas to smoothly flow when filling resin.

On the other hand, in Patent Document 2 and Patent Document 3, it is intended to achieve the heating and cooling as described above with efficiency by adopting a constitution in which all of the ventilation channels through which a gas blown or sucked by a primary vent passes and a secondary vent which are in contact with a resin molding portion are formed by a low-density shaped portion.

However, when all of the primary vents and the secondary vents are formed by a low-density shaped portion, a pressure necessary for blowing or suction may not avoid a state of extremely high due to the cause of communication resistance in the low-density shaped portion interposed between the primary vents and the secondary vents.

Furthermore, because the pressure at the secondary vent is not uniform but depends on the degree of the density within the low-density shaped portion and the mold shape, the ventilation volume per unit area of a gas that flows in or out in a section with the resin molding portion is not always uniform, resulting in the case where uniform heating and cooling arise.

PRIOR ART DOCUMENTS

Patent Documents

[Patent Document 1] Japanese Published Unexamined Patent Application No. 2007-160580
[Patent Document 2] Japanese Patent No. 5575374
[Patent Document 3] Japanese Published Unexamined Patent Application No. H08-300363

SUMMARY OF THE INVENTION

Disclosure of the Invention

Problem to be Solved by the Invention

It is an object of the present invention to provide a constitution of a mold for resin injection molding that brings the pressure at the secondary vent into a uniform state while achieving efficient blowing or suction of gas.

Means for Solving the Problem

In order to achieve the above-described object, a basic construction of the present invention is as follows:

A mold for resin injection molding has a shaping region with an inner wall and an outer wall formed by a low-density shaped portion provided between the inner wall and the outer wall having a sintered density that allows gas discharged and sucking in with heating or cooling, and gas passing with resin blown, and a high-density shaped portion having a sintered density that does not allow the gas to pass therethrough and surrounding the low-density shaped portion.

There is at least one ventilation channel for gas, with each ventilation channel being formed between at least one primary vent connecting communicatively with an exterior and at least one secondary vent connecting communicatively with a resin molding portion at an inside and with each ventilation channel communicating with both of at least one primary vent and at least one secondary vent, and each ventilation channel forms a hollow state surrounded by a peripheral wall having any one or both of the high-density shaped portion and the low-density shaped portion, and that each secondary vent is formed only by the low-density shaped portion in a state of having a wall with thickness thinner than all thicknesses of the shaping region.

BRIEF DESCRIPTION OF THE DRAWINGS

FIG. 1 shows a state of Example 1 characterized in that plural ventilation channels are provided in a cavity shape mold for resin injection molding.

FIG. 2 shows a state of Example 2 characterized in that the degree of the sintered density gradually changes in a boundary region between a high-density shaped portion and a low-density shaped portion.

FIG. 3 shows a typical embodiment of the present invention.

FIG. 4 shows another embodiment in a core shape mold having a projection region inside of a peripheral wall.

FIG. 5 shows an embodiment in a state in which the thickness of the secondary vent is reduced at the inside as compared with a surrounding region.

DESCRIPTION OF THE SYMBOLS

1: Mold for resin injection molding
11: Core shape mold
12: Cavity shape mold
21: High-density shaped portion
22: Low-density shaped portion
31: Primary vent
32: Ventilation channel
33: Secondary vent
4: Base plate
5: Resin providing portion
6: Resin molding portion
7: Forming enclosed region portion

DETAILED DESCRIPTION

Best Mode for Carrying Out the Invention

As shown in a typical embodiment of FIG. 3, in a basic constitution of the present invention, each ventilation channel 32 exists between one primary vent or plural primary vents 31 and one secondary vent or plural secondary vents 33, and forms a hollow state surrounded by a peripheral wall having any one or both of the high-density shaped portion 21 and the low-density shaped portion 22.

In such a hollow ventilation channel 32, a pressure loss is smaller compared with a state that gas passes through the low-density shaped portion 22 as in the case of Patent Document 2, so efficient ventilation can be achieved.

Furthermore, because the pressure in the case of an ordinary ventilation channel 32 is equal, the pressure at the respective secondary vent 33 in the identical ventilation channel 32 is equal regardless of the mold shape, and when plural secondary vents 33 are made equal in average wall thickness, the ventilation volume per unit area can be brought into an equal state.

Additionally, most of the molds 1 for resin injection molding are, as shown in FIG. 3, composed of both of a core shape mold 11 with projected region and a cavity shape mold 12 without projected region, and when blowing is performed in the primary vent 31 of one of the core shape mold 11 and the cavity shape mold 12, discharge of gas is performed in the primary vent 31 of the other of the core shape mold 11 and the cavity shape mold 12 and when suction is performed in one of the core shape mold 11 and the cavity shape mold 12, entry of gas is performed in the primary vent 31 of the other of the core shape mold 11 and the cavity shape mold 12.

However, of course, it is also possible to adopt such an embodiment that blowing is performed in the primary vent 31 of one of the core shape mold 11 and the cavity shape mold 12 and suction is performed in the primary vent 31 of the other of the core shape mold 11 and the cavity shape mold 12.

In FIG. 3, the entire peripheral wall is formed for the ventilation channel 32 by the high-density shaped portion 21 in both of the core shape mold 11 and the cavity shape mold 12, and the peripheral wall can also be formed partially or entirely by the low-density shaped portion 22.

Because, even if the peripheral wall is formed partially or entirely by the low-density shaped portion 22, gas inevitably passes through the secondary vent 33 due to the cause that the secondary vent 33 has a wall with thickness thinner than that of the shaping region, and a state of causing a pressure loss as is the case of the conventional technology does not arise in which gas passes through a shaping region formed by the low-density shaped portion 22, and so the resin molding portion 6 and the primary vent 31 are connected communicatively.

However, in the case of a peripheral wall by the low-density shaped portion 22, because of entry of gas into a partial region of the low-density shaped portion 22, the ventilation volume at the secondary vent 33 decreases, and considering such a decreasing of the ventilation volume, it is preferable that the peripheral wall is entirely formed by the high-density shaped portion 21 as is shown in FIG. 3.

In a region of forming a wall portion that contacts the resin molding portion 6, persons skilled in the art can arbitrarily select which of the high-density shaped portion 21 as shown in FIG. 3 or the low-density shaped portion 22 as shown in FIG. 4 should be adopted.

However, taking into consideration the lifetime of the mold, the high-density shaped portion 21 is preferably adopted for the region of forming the wall.

In the core shape mold 11, an embodiment is often adopted which is characterized, as shown in FIG. 3, in that the secondary vent 33 is provided in any one or both of a gap between an inner wall portion and the projection region and a gap between projection regions.

However, as shown in FIG. 4, one secondary vent or plural secondary vents 33 can also be provided for the core shape mold 11 in the peripheral wall of the projection region.

In the cavity shape mold 12, as shown in FIG. 3, one secondary vent is or plural secondary vents 33 are often provided in a bottom portion surrounded by a peripheral wall.

Gas can flow into the resin molding portion 6 or flow out from the resin molding portion 6 almost equivalently through plural secondary vents 33.

However, in the case that a distance between peripheral walls is shorter than their height, an embodiment in which the secondary vent 33 is provided inside of the peripheral wall may be adopted.

The secondary vent 33 is required to satisfy both items that can stand a pressure associated with resin molding and that gas outflows or inflows efficiently between the secondary vent 33 and the resin molding portion 6.

The wall thickness of the secondary vent 33 is dependent on a sintered density of the low-density shaped portion 22, and in most cases both requirements are satisfied by adopting the wall of thickness from 2 mm to 5 mm.

FIG. 5 shows an embodiment of the secondary vent 33 characterized in that a region at the inside thereof is formed with a gradually thin state compared with a surrounding region.

In the case of above embodiment, a pressure associated with resin molding is supported by the surrounding region of the secondary vent 33 or a vicinity thereof, while gas can blow out or blow in efficiently thorough a thin-walled region in the center or a vicinity thereof.

Additionally, also in the embodiment shown in FIG. 5, by setting an average value of the wall thicknesses of the secondary vent 33 to be in a range from 2 mm to 5 mm, both requirements of the wall standing the pressure associated with resin molding and sufficient gas outflowing or inflowing can be satisfied.

EXAMPLES

Hereinafter, the following examples are described.

Example 1

Example 1 is characterized in that, as shown in FIG. 1, plural ventilation channels 32 are set up for communicating with each primary vent 31 and each secondary vent 33.

In Example 1 with such a characteristic, when the degree of necessary heating or cooling is different arisen by a difference of the shape of a resin molding region, ventilation volume can be controlled separately according to respective ventilation channels 32, and so proper heating or cooling of a corresponding resin molding region can be achieved.

Example 2

Example 2 is characterized in that, as shown in FIG. 2, the degree of the sintered density gradually changes in a boundary region between a high-density shaped portion 21 and a low-density shaped portion 22.

Example 2 with such a characteristic may be achieved by the process that in respectively molding the high-density shaped portion 21 and the low-density shaped portion 22, gradually reducing the pressure of air to be injected into the low-density shaped portion 22 in the vicinity of a boundary of the high-density shaped portion 21 allows gradual change to molding of the high-density shaped portion 21.

As in FIG. 3, FIG. 4, and FIG. 5, the high-density shaped portion 21 and the low-density shaped portion 22 must be separately molded when both shaped portions are clearly divided at a boundary, whereas continuous molding can be achieved in the case of Example 2.

Effect of the Invention

In the basic construction of this invention, the ventilation channel is a hollow state surrounded by the peripheral wall formed by any one or both of the high-density shaped portion and the low-density shaped portion, and the primary vent and the secondary vent are connected communicatively with each other, a gas blown or sucked by the primary vent can flow in or flow out through the secondary vent having a wall with thickness thinner than that of the shaping region and flow efficiently between the resin molding portion.

So that in heating and cooling in the mold and ventilation with filling of resin, a pressure loss in conventional technology can be prevented.

Further, as a pressure is equal in an identical ventilation channel, so the pressure at the secondary vent is equal regardless of the mold shape, and the ventilation volume per unit area can be brought into an equal state by setting an equal wall thickness for the secondary vent.

Therefore, this invention can achieve heating and cooling with efficient and uniform ventilation, and can be widely applied to molds for resin injection molding.

What is claimed is:

1. A mold for resin injection molding including a core shape mold and a cavity shape mold, each mold comprising:
    a shaping region with an inner wall and an outer wall formed by:
        a low-density shaped portion provided between the inner wall and the outer wall having a sintered density that allows gas discharging and sucking in with heating or cooling, and gas passing with resin blown, and
        a high-density shaped portion having a sintered density that does not allow the gas to pass therethrough and surrounding the low-density shaped portion,
    at least one primary vent connecting communicatively with an exterior of the mold,
    at least one secondary vent connecting communicatively with a resin molding portion at an inside of the mold, each secondary vent being separate and distinct from and not directly connected with the low-density shaped portion of the shaping region,
    at least one ventilation channel for gas, with each ventilation channel being formed between at least one said primary vent and at least one said secondary vent, with each ventilation channel communicating with both of at least one said primary vent and at least one said secondary vent, and each said ventilation channel forms a hollow state surrounded by a peripheral wall having at least one of the high-density shaped portion and the low-density shaped portion, and
    wherein each secondary vent is formed only by the low-density shaped portion in a state of having a wall with thickness thinner than that of a remainder of the shaping region.

2. The mold for resin injection molding according to claim 1, in the core shape mold with a projection region inside of a peripheral wall, wherein each secondary vent is provided in at least one of:
    a gap between an inner wall portion and the projection region and
    a gap between projection regions.

3. The mold for resin injection molding according to claim 1, in the cavity shape mold without a projection region inside of a peripheral wall, wherein each secondary vent is provided in a bottom portion surrounded by an inner wall portion.

4. The mold for resin injection molding according to claim 1, wherein a degree of a sintered density gradually changes in a boundary region between at least one high-density shaped portion and at least one low-density shaped portion.

5. The mold for resin injection molding according to claim 1, wherein each secondary vent has a thickness from 2 mm to 5 mm.

6. The mold for resin injection molding according to claim 1, wherein a region at the inside thereof is formed in a gradually thin state compared with a surrounding region.

7. The mold for resin injection molding according to claim 6, wherein an average thickness of each secondary vent is from 2 mm to 5 mm.

8. The mold for resin injection molding according to claim 1, wherein plural ventilation channels are set up for connecting communicatively with each primary vent and each secondary vent.

9. The mold for resin injection molding according to claim 8, wherein air pressures for blowing and suction are separately controlled according to respective ventilation channels.

10. The mold for resin injection molding according to claim 1, wherein the high-density shaped portion is provided between the inner wall and the outer wall.

\* \* \* \* \*